UNITED STATES PATENT OFFICE.

HANS BELART, OF HUDDERSFIELD, ENGLAND.

PREPARATION OF EUGENOL AND ALBUMIN.

973,908. Specification of Letters Patent. Patented Oct. 25, 1910.

No Drawing. Application filed May 8, 1908. Serial No. 431,698. (Specimens.)

*To all whom it may concern:*

Be it known that I, HANS BELART, a citizen of Switzerland, residing at Huddersfield, in the county of York, Kingdom of Great Britain, have invented new and useful Improvements in Preparations of Eugenol and Albumin, of which the following is a specification.

In treating tuberculous diseases, hitherto the disinfecting phenols used besides creosote, have been mainly guaiacol, either by itself or in its compounds, for instance carbonate or thiocol, as other phenols such as cresol and xylenol, could not be used owing to their caustic and partly direct poisonous action. Creosote and guaiacol before being used, were either mixed with milk or according to the process described in specification of English Letters Patent granted to H. C. Fehrlin, No. 449 of 1904, guaiacol or guaethol were formed into indigestible egg albumin compounds. These compounds are also not free from the guaiacol-tar odor so disagreeable to patients. While the other phenol albumin compounds such as carbolic acid and cresol, xylenol have been found unusable, owing to their caustic and poisonous action becoming evident again in being split up by the mucus in the bowels, it has been found, that eugenol and isoeugenol or oil of cloves consisting as is well known principally of eugenol, combined with albumin, such as for instance albumin of eggs and casein, give compounds which resemble those of guaiacol and other phenols in their chemical composition but which are distinguished by their eminent therapeutic properties, particularly in the treatment of tuberculous diseases. Having a rapid healing effect, they possess neither the poisonous subsidiary properties of other phenols nor the disagreeable tar-odor of the guaiacol or guaethol and are not only disinfecting owing to their phenol character but have also a soothing, sleep-inducing and cough-stopping effect, as in the human body a part of the eugenol and still more of the isoeugenol will form into vanillin which is clearly observable from the odor of the urine. This conspicuously favorable effect could not be expected *a priori*.

The new compounds are produced in the same manner as other phenol albumin compounds.

The chemical reaction which takes place may be illustrated by the following equation—

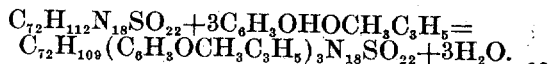

$$C_{72}H_{112}N_{18}SO_{22} + 3C_6H_3OHOCH_3C_3H_5 = C_{72}H_{109}(C_6H_3OCH_3C_3H_5)_3N_{18}SO_{22} + 3H_2O.$$

The following is an example—164 parts eugenol or 180 parts commercial oil of cloves are dissolved in 1,000 parts of water and 40 parts of caustic alkali and added to a solution of 1,600 parts albumin of eggs and 10,000 parts of water. This solution is poured into 54 parts of sulfuric acid and 500 parts of water by constant stirring. The mixture is then heated until boiling, the white coagulum formed is filtered off, washed with hot water, pressed, washed again with hot water and finally with alcohol. The product is then dried and for a few hours subjected to a heat of 115–120 centigrade. The body thus obtained is an orange yellow powder in smell slightly like oil of cloves and is insoluble in water or diluted acid.

I claim:

1. A process for the production of a compound of eugenol and albumin, consisting in mixing a watery alkaline solution of eugenol with a watery solution of albumin, isolating, washing, and drying the reaction product formed, and rendering it indigestible in the stomach by subjecting it to a heat of 115–120 centigrade, substantially as and for the purpose set forth.

2. As a new product, a compound for internal use, composed of eugenol and albumin, and in the form of a yellow powder, insoluble in water and diluted acids, easily splitting up into its two components eugenol and albumin by the action of alkalies or the alkaline action of the mucus of the bowels, substantially as set forth.

In testimony whereof I have signed my name to this specification in the presence of two subscribing witnesses.

HANS BELART.

Witnesses:
ALFRED BOSSHARDT,
STANLEY E. BRAMALL.